3,283,022
1-CYCLOPROPYL-5-VINYL CYCLOPENTENE AND 8-VINYL BICYCLO[3,3,0]OCTENE-1 PREPARATION
Arthur D. Ketley, Bethesda, Md., assignor to W. R. Grace & Co., New York, N.Y., a corporation of Connecticut
No Drawing. Filed Dec. 17, 1964, Ser. No. 419,205
7 Claims. (Cl. 260—666)

This invention relates to a process for preparing a new composition of matter. In one particular aspect, this invention relates to 1-cyclopropyl-5-vinylcyclopentene and to the process for preparing it. In another particular aspect, this invention relates to 8-vinyl bicyclo[3,3,0]octene-1 and to the process for preparing it.

According to this invention, 1,1-dicyclopropyl-1,3-butadiene is thermally rearranged to form 1-cyclopropyl-5-vinylcyclopentene. The 1-cyclopropyl-5-vinylcyclopentene may then be thermally rearranged to form 8-vinyl bicyclo[3,3,0]octene-1.

Briefly stated, the present invention comprises heating 1,1-dicyclopropyl-1,3-butadiene in vapor form in a substantially inert pyrolysis reaction zone at a temperature in the range of about 300 to 475° C. for a period of time sufficient to form a vapor containing a member of the group consisting of 1-cyclopropyl-5-vinylcyclopentene, 8-vinyl bicyclo[3,3,0]octene-1, and mixtures thereof; and condensing the resulting vapor.

The thermal rearrangement of 1,1-dicyclopropyl-1,3-butadiene to form 1-cyclopropyl-5-vinylcyclopentene and 8-vinyl bicyclo[3,3,0]octene-1 may be illustrated in equation form as follows:

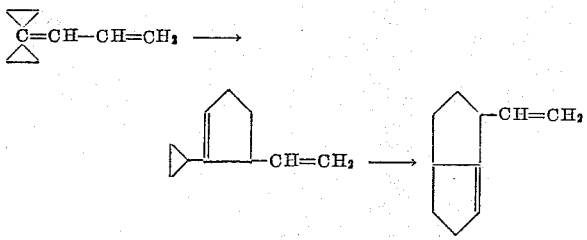

The thermal conversion of 1,1-dicyclopropyl-1,3-butadiene according to the instant invention should be carried out in a substantially inert zone, i.e. under anhydrous conditions in the absence of air, to avoid side reactions. Any conventional method may be used to provide the desired inert conditions. Usually, a steady flow of a dry inert gas, such as nitrogen or argon, through the pyrolysis zone provides satisfactory inert conditions. Suitable inert conditions may also be provided by carrying out the reaction under a high vacuum.

In the process of the present invention, the 1,1-dicyclopropyl-1,3-butadiene is heated in a pyrolysis reaction zone. For example, the compound may be passed through a pyrolysis reaction tube provided with equipment for heating. The reaction tube may be of porcelain, glass or quartz. Heat may be applied to the tube by a gas-fired furnace, an electric furnace, or by a simple winding of the tube with electrically heated resistance wire. The temperature of the tube may be recorded by manual or automatic devices. A protected thermocouple may be placed within the reaction tube if the tube is big enough.

When the 1,1-dicyclopropyl-1,3-butadiene is passed through the pyrolysis reaction zone in vapor form, the zone should be packed with a substantially indifferent, i.e. inert, material of high surface area. The packing must be substantially inert so that it will not catalyze the pyrolysis reaction to produce undesirable side products. In addition, the packing must have high surface area so that substantially all of the vapor passed through the packed reaction zone is contacted with a surface heated to pyrolyzing temperature. As a result, the vapor within the reaction zone is subjected to pyrolyzing temperature uniformly.

Representative of the substantially inert materials suitable for use as packing in the pyrolysis reaction zone are glass fibers such as glass wool, glass particles such as glass helices and porcelain particles such as porcelain saddles.

The pyrolysis may also be carried out in a sealed container under high vacuum such that, on heating, all the 1,1-dicyclopropyl-1,3-butadiene is in the gas phase. The sealed vessel may conveniently be heated in an oven.

At atmospheric pressure the temperature of the pyrolysis reaction may range from 300 to 475° C. depending on the particular pyrolysis product desired, i.e. 1-cyclopropyl-5-vinylcyclopentene and 8-vinyl bicyclo[3,3,0]octene-1. Generally, temperatures lower than 300° C. will not convert the 1,1-dicyclopropyl-1,3-butadiene to the desired products in significant amounts. On the other hand, temperatures higher than 475° C. are not suitable since they produce undesirable side products.

The composition produced according to the instant invention will depend largely on the specific temperature of the pyrolysis reaction and the residence time of the 1,1-dicyclopropyl-1,3-butadiene in the pyrolysis reaction zone. For example, at a temperature of 300° C., a portion of the 1,1-dicyclopropyl-1,3-butadiene rearranges slowly to 1-cyclopropyl-5-vinylcyclopentene. At 400° C., 1,1-dicyclopropyl-1,3-butadiene may be completely converted to a mixture comprised of 1-cyclopropyl-5-vinylcyclopentene and 8-vinyl bicyclo[3,3,0]octene-1. The amount of each component present in the mixture will depend on the residence time, i.e. longer residence times producing higher yields of the 8-vinyl bicyclo[3,3,0]octene-1. At a temperature of 450° C., the conversion of 1-cyclopropyl-5-vinylcyclopentene to 8-vinyl bicyclo[3,3,0]octene-1 is more rapid and traces of lower boiling side products are formed.

The pressure of the pyrolysis reaction may range from 0.001 to 100 atmospheres. Atmospheric pressure, however, is preferred.

The compounds produced according to the present invention may be polymerized to form polymers and copolymers suitable for a number of uses.

All parts and percentages used herein are by weight unless otherwise indicated.

This invention is further illustrated by the following examples.

Unless otherwise stated, tests in the following examples were made as follows:

Gas chromatograms were made using a dimethylsiloxane polymer column at 106° C. using a Perkin-Elmer Vapor Fractometer, Model 154, or an Aerograph Model A 350B. The products produced by pyrolysis were also separated by these instruments.

Structures of the compounds were verified by nuclear magnetic resonance (NMR) spectroscopy and infrared (IR) spectroscopy. For NMR studies, the compound was dissolved in carbon tetrachloride to form a solution equivalent to 15 parts by weight of the compound in 100 cc. of carbon tetrachloride. The solution was then analyzed on a Varian "HR 60 Nuclear Magnetic Resonance Spectrometer" using tetramethylsilane as an internal reference.

Infrared measurements were made on undiluted samples on a Perkin-Elmer Spectrophotometer, Model 221.

*Example 1*

In this example, 1,1-dicyclopropyl-1,3-butadiene was synthesized.

20 grams of dicyclopropyl allyl carbinol were mixed with 60 grams of freshly distilled acetic anhydride and heated to 125° C. for 30 minutes. At the end of this time, water was added. Two layers resulted, an organic layer and an aqueous layer. The aqueous layer was recovered and extracted with ether. It was combined with the organic layer and washed with a 10% sodium carbonate solution and dried over anhydrous sodium sulfate. The ether was then distilled off and the product was fractionated. The 1,1-dicyclopropyl-1,3-butadiene cut had a boiling point of 69° C. at 9 mm. and contained some carbinol which could not be fractionated out.

To purify the 1,1-dicyclopropyl-1,3-butadiene cut, it was passed through a hot tube at 300° C. for a short period of time so that the carbinol was converted to dicyclopropyl ketone and propylene but the 1,1-dicyclopropyl-1,3-butadiene was not rearranged. The resulting product was then fractionated to produce pure 1,1-dicyclopropyl-1,3-butadiene having a boiling point of 70° C. at 9 mm.

NMR and infrared spectrums of the resulting product confirmed its structure to be 1,1-dicyclopropyl-1,3-butadiene.

Example 2

In this example, 1,1-dicyclopropyl-1,3-butadiene prepared in Example 1 was thermally rearranged to 1-cyclopropyl-5-vinylcyclopentene, a portion of which was then rearranged to give 8-vinyl bicyclo[3,3,0]octene-1.

A glass pyrolysis reaction tube, 60 centimeters long and 2.7 centimeters in diameter, was packed tightly with glass wool. A thermocouple encased in a glass capillary tube, was placed in the center of the pyrolysis reaction tube along a substantial length of the tube.

The reaction tube was placed in a vertical position and dry nitrogen was introduced into the top of the tube at a rate of about 15 to 20 ml. per minute. The reaction tube was wrapped with heating tape, the temperature of which was regulated by a powerstat. The top portion of the tube was provided with a dropping funnel. The bottom portion of the tube was connected to a condenser which was provided with a receiving flask.

A control gas chromatogram of the 1,1-dicyclopropyl-1,3-butadiene was made to evaluate the extent of the pyrolysis reaction.

The pyrolysis tube was heated to a temperature of 400° C. The 1,1-dicyclopropyl-1,3-butadiene was introduced into the top of the pyrolysis reaction tube at a rate of about 25 ml. per hour. A gas chromatogram was made of the resulting condensate and compared to the control gas chromatogram. Areas under the peaks of the chromatograms were determined.

The comparison showed that the condensate was a mixture comprised of 85 percent of a compound believed to be 1-cyclopropyl-5-vinyl-cyclopentene and 15 percent of a compound believed to be 8-vinyl bicyclo[3,3,0]octene-1.

The condensate was passed back through the reaction tube two times. A gas chromatogram was made of the final condensate and compared to the control gas chromatogram. The comparison showed the mixture to be comprised of 33% of the 8-vinyl bicyclo[3,3,0]octene-1 and 67% of the 1-cyclopropyl-5-vinylcyclopentene. The structure of each compound was then verified by infrared and nuclear magnetic resonance spectroscopy. The NMR spectrum and IR spectrum showed the structure of one compound to be 1-cyclopropyl-5-vinylcyclopentene having the formula

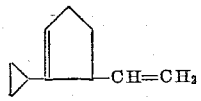

and the structure of the second compound which was found to be 8-vinyl bicyclo[3,3,0]octene-1 having the formula

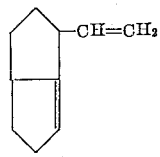

Example 3

The general procedure and apparatus used in this example was substantially the same as that disclosed in Example 2 except that the pyrolysis reaction tube was heated to a temperature of 450° C.

1,1-dicyclopropyl-1,3-butadiene was passed through the reaction tube and the resulting condensate was passed back through the tube two times. A gas chromatogram was made of the final condensate and compared to the control gas chromatogram of Example 2. The final condensate was comprised of 8-vinyl bicyclo[3,3,0]-octene-1.

Example 4

The general procedure and apparatus used in this example was substantially the same as that disclosed in Example 2 except that the pyrolysis reaction tube was heated to a temperature of 300° C.

The 1,1-dicyclopropyl-1,3-butadiene was passed through the pyrolysis reaction tube and the resulting condensate was passed back through the reaction tube two times.

A gas chromatogram was made of the final condensate and compared to the control gas chromatogram of Example 2. The condensate was determined to be a mixture comprised of 60% 1,1-dicyclopropyl-1,3-butadiene and 40% of 1-cyclopropyl-5-vinylcyclopentene.

Pure 1-cyclopropyl-5-vinylcyclopentene was isolated from the mixture using a Nester-Faust Prepkro preparative gas chromatograph.

Example 5

The vinyl compound of this invention has many uses. A typical use is as a monomer in the preparation of poly-1-cyclopropyl-5-vinylcyclopentene as will be explained below. Also the compound can be used as a comonomer, in minor amounts, in the polymerization of other ethylenically unsaturated monomers, with or without additional comonomers. For example one application is to use 1-cyclopropyl-5-vinylcyclopentene in a minor amount, e.g., 2%, in the known synthesis ethylene-propylene rubber copolymers.

In preparing poly-1-cyclopropyl-5-vinylcyclopentene the following formulation can be used:

| | Grams |
|---|---|
| 1-cyclopropyl-5-vinylcyclopentene | 5 |
| Hexane | 25 |
| Titanium trichloride | 0.2 |
| Triethyl aluminum | 1.5 |

The reaction is carried out in a stirred round bottom flask under an atmosphere of argon at 55° C. for 10 hours. At the end of this time the contents of the flask are poured into isopropyl alcohol containing 5% of concentrate hydrochloric acid. This operation serves to precipitate polymeric 1-cyclopropyl-5-vinylcyclopentene, which is then filtered, dried under a vacuum, and recovered. The product was recovered as a solid, in powder form. A portion of the product was pressed into a clear film, somewhat brittle.

Example 6

The foregoing procedure was followed in polymerizing 5 grams of 8-vinyl bicyclo[3,3,0]octene-1. Poly-8-vinyl bicyclo[3,3,0]octene-1 was worked up and recovered in the same manner as in the preceding example. It made a fairly good film.

What is claimed is:

1. A process which comprises heating 1,1-dicyclopropyl-1,3-butadiene in vapor form in a substantially inert reaction zone at a temperature in the range of 300 to 475° C. for a period of time sufficient to form a vapor comprising 1-cyclopropyl-5-vinylcyclopentene and 8-vinyl bicyclo[3,3,0]octene-1, and condensing the resulting vapor.

2. A process according to claim 1 wherein the reaction zone is packed with substantially indifferent material.

3. A process according to claim 2 wherein the temperature is 300° C.

4. A process according to claim 2 wherein the temperature is 400° C.

5. A process according to claim 2 wherein the temperature is 450° C.

6. 1-cyclopropyl-5-vinylcyclopentene having the formula

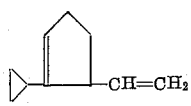

7. 8-vinyl bicyclo[3,3,0]octene-1 having the formula

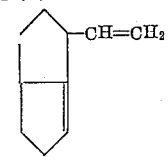

References Cited by the Examiner

Marshall Gates, J. Amer. Chem. Soc., vol. 79, pp. 5546–50, 1957.

A. D. Ketley: Tetrahedron Letters, pp. 25, 26, 1964.

A. D. Ketley et al.: J. Org. Chem. 30 (5), pp. 1659–61, 1965.

DELBERT E. GANTZ, *Primary Examiner.*

V. O'KEEFE, *Assistant Examiner.*